(12) United States Patent
Hoffman et al.

(10) Patent No.: US 8,561,529 B2
(45) Date of Patent: Oct. 22, 2013

(54) FOOD SLICER AND CONTAINER

(75) Inventors: John Hoffman, Chicago, IL (US); Dean Lindsay, Wilmette, IL (US); Jose Tirso Olivares Cordoba, Chicago, IL (US)

(73) Assignee: Apple Inferno, Inc., Chicago, IL (US)

( * ) Notice: Subject to any disclaimer, the term of this patent is extended or adjusted under 35 U.S.C. 154(b) by 903 days.

(21) Appl. No.: 12/172,368

(22) Filed: Jul. 14, 2008

(65) Prior Publication Data
US 2010/0005978 A1   Jan. 14, 2010

(51) Int. Cl.
*A23N 4/04*   (2006.01)
(52) U.S. Cl.
USPC .......................................................... 99/537
(58) Field of Classification Search
USPC ...................... 99/537, 538; 83/167
See application file for complete search history.

(56) References Cited

U.S. PATENT DOCUMENTS

| | | | |
|---|---|---|---|
| 5,216,031 A * | 6/1993 | Dobson et al. | 99/538 |
| 5,308,630 A | 5/1994 | Nordahl | |
| 5,337,480 A * | 8/1994 | Codikow | 30/114 |
| 7,779,739 B2 * | 8/2010 | Peterson et al. | 83/858 |
| 2007/0134386 A1 * | 6/2007 | Michael et al. | 426/518 |
| 2009/0249930 A1 | 10/2009 | Peterson et al. | |
| 2009/0249935 A1 * | 10/2009 | Kaposi | 83/635 |

OTHER PUBLICATIONS

Photograph of KitchenAid Fruit Slicer/Wedger Set taken Mar. 7, 2011, 1 page.

* cited by examiner

*Primary Examiner* — Raeann Gorden
(74) *Attorney, Agent, or Firm* — Beem Patent Law Firm

(57) ABSTRACT

In one aspect of the invention, a container for displaying, preparing and presenting food including a base having an integrated cutter having a plurality of blades and a central hub and a cover removably attached to the base for displaying the food prior to use and for storing the food during and after cutting, the cover having indentations to receive the central hub and possibly the blades to enhance the depth of cutting by the cutter through the food. The base and cover have side walls dimensioned so that the cover interfaces with the base after driving.

15 Claims, 2 Drawing Sheets

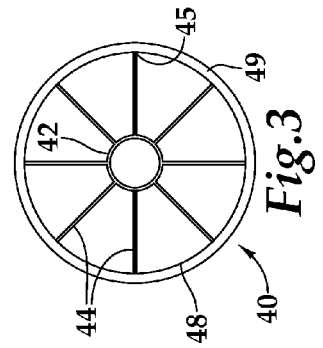
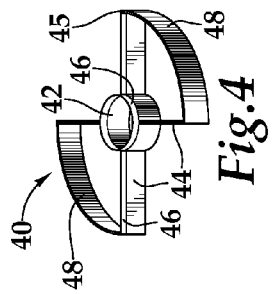
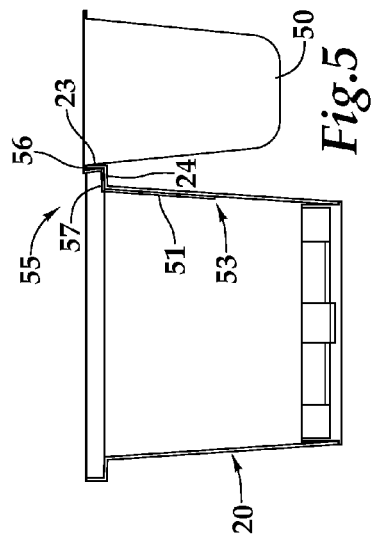
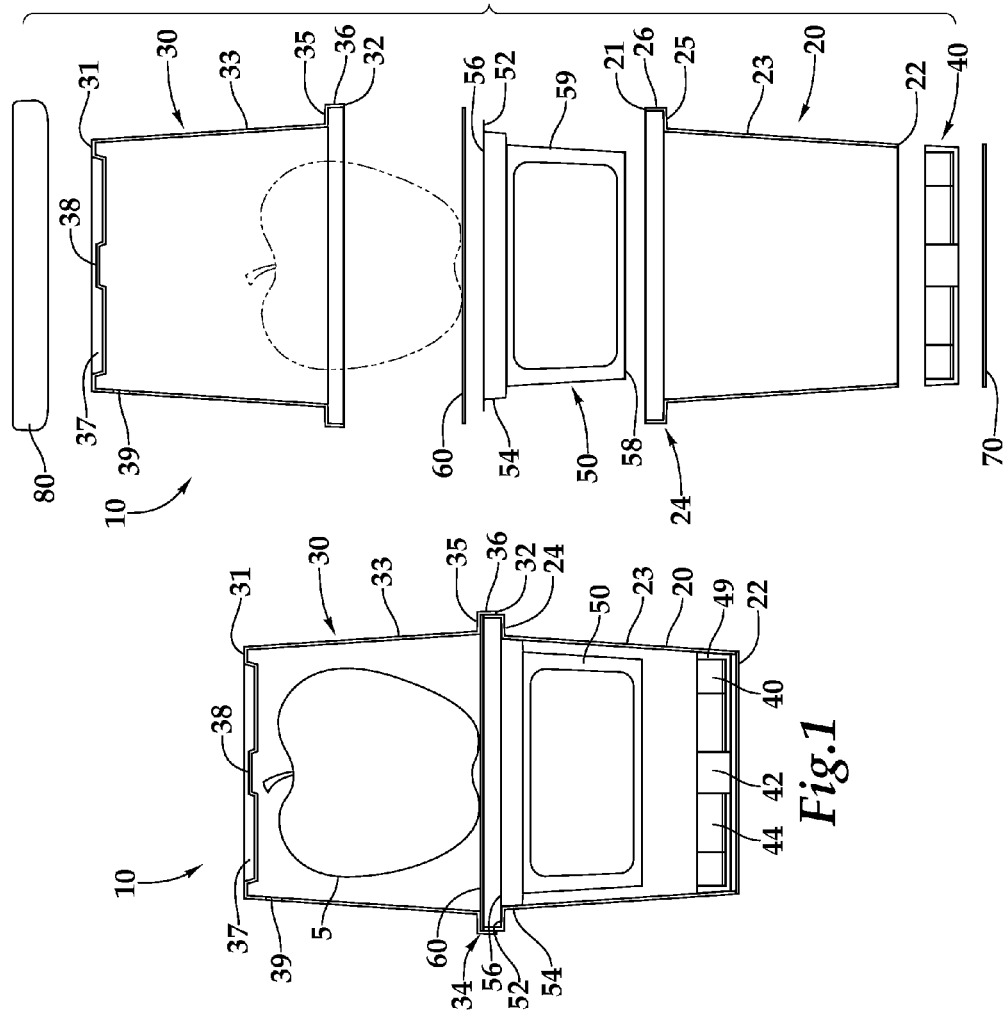

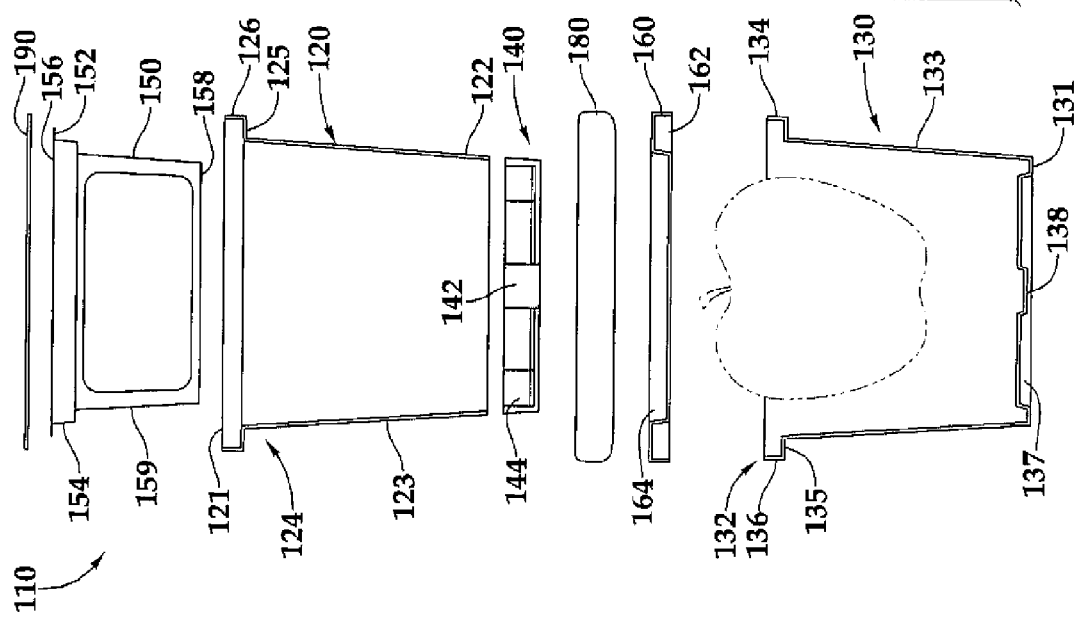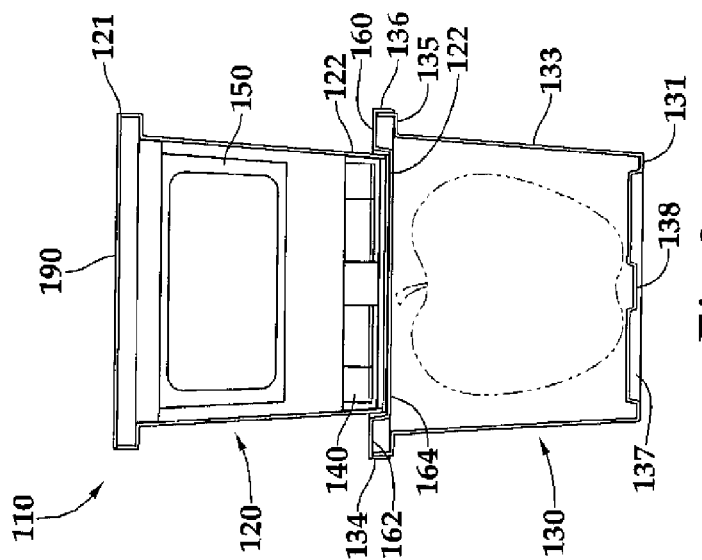

FOOD SLICER AND CONTAINER

BACKGROUND OF THE INVENTION

1. Field of the Invention

The present invention is directed to a food slicer and container.

2. Description of the Related Art

Many food items such as fruit are currently considered fungible goods. For example, to many customers, one apple is just as good as the next. However, even if this is the case, the food items are usually displayed in a bulk fashion at a store where customers are allowed to touch even the items that they decide not to purchase, and many customers will still pick up multiple apples before selecting the one they ultimately purchase.

While many food products are packaged to protect them during shipment to a store, once a customer decides to purchase a food item, that item may become bruised or otherwise damaged during transportation. Moreover, the customer may want additional utensils, for example, a corer and a knife, if they wish to prepare and eat the food item. While food containers of varying types may be known in the art, such as U.S. Patent Publication 2007/0134386 to Michael, et al., these devices require separate slicing devices and are not designed for presentation of the food prior to slicing.

What is needed is a food storage, preparation and serving container that overcomes the drawbacks described above.

BRIEF SUMMARY OF THE INVENTION

In one aspect of the invention, a food slicer and container, comprising a base having an upper end, a lower end and at least one side wall, a cover removably attached to the base having a closed end, an open end and at least one second side wall, the base further having a cutter having a hub and a plurality of blades wherein the cover is sized to hold a piece of food and the side wall of the base is sized to fit inside the sidewall of the cover. The base may further comprise a lip at the upper end, the lip having a bottom portion and a first side portion, the cover further comprising a lip at the open end having an outwardly extending portion and a second side portion wherein the first side portion operatively engages the second side portion. The container may further comprising an accessory cup, which may have an arm having proximal end having a tongue and a distal end wherein the arm operatively engages the at least one second side wall of the cover and the tongue operatively engages the lip of the cover. The hub may have a lower end that extends beyond a lower end of said blades and the closed end of the cover may have a recess for receiving the cutter. In addition, the container may have a shield removably attached to the lower end of the base and a separator between the outwardly extending portion of the cover and the bottom portion of the lip of the base.

In another aspect of the invention, a food slicer and container may comprise a base having an upper end and a lower end having a cutter having a plurality of blades and a hub, a shield removable attached to the lower end of the base proximate the cutter, a cover having an open end and a closed end and removably attached to the base, the cover having a recess at the closed end that is sized for receiving the blades and hub of the cutter and a separator between the base and cover. The hub of the cutter may extend beyond the blades. In addition, the base may have at least one side wall tapered at a first angle from its upper end to its lower end, the cover may have at least one second side wall tapered at a second angle from its open end to its closed end, and the first angle may be substantially the same as the second angle.

In still another aspect of the invention, a food slicer and may have a first receptacle having a side wall, a second receptacle removably attached to said first receptacle having a side wall and a cutter having a hub and a plurality of blades. In a first pre-slicing position, one of the receptacles is held in a substantially non-overlapping position with respect to the other receptacle. In a second post-slicing position, one of the receptacles nests inside the other of receptacles. The invention may further comprise a food slicing system additionally comprising a food item. In this embodiment, in the first pre-slicing position, the food item may be substantially contained within one of the receptacles. In the second post-slicing position, the food item may substantially nest within both of the receptacles.

These and other features and advantages are evident from the following description of the present invention, with reference to the accompanying drawings.

BRIEF DESCRIPTION OF THE SEVERAL VIEWS OF THE DRAWINGS

FIG. 1 is a section view of one embodiment of a food slicer and container taken along a plane bisecting the food slicer and container.

FIG. 2 is an exploded section view of the container of FIG. 1 taken along a plane bisecting the food slicer and container.

FIG. 3 is a top view of one embodiment of a cutter used with the food slicer and container.

FIG. 4 is an isometric bottom view of a second embodiment of a cutter used with the food slicer and container.

FIG. 5 is a side view of a food slicer and container employing another embodiment of an accessory cup.

FIG. 6 is a section view of another embodiment of a food slicer and container taken along a plane bisecting the food slicer and container.

FIG. 7 is an exploded section view of the container of FIG. 6.

DETAILED DESCRIPTION

While the invention described herein may be useful with a variety of food items, for convenience sake it will be described in terms of a container for displaying, preparing and serving an apple. The invention may further comprise a food slicer and container system 10, including a food item 5.

As seen in FIGS. 1-3, container 10 may comprise a first receptacle or base 20 removably connected to a second receptacle or cover 30. Base 20 may have an upper end 21, a lower end 22 and at least one side wall 23 and base 20 may further comprise a cutter 40. Cutter 40 may be spaced anywhere between upper end 21 and lower end 22, but preferably cutter 40 is proximate lower end 22. Base 20 may further comprise a lip 24 having a bottom portion 25 and a side portion 26. Bottom portion 25 and side portion 26 of lip 24 may have interruptions, but preferably lip 24 continues generally uninterrupted around a perimeter of base 20. Moreover, side wall 23 may taper at a generally constant first angle from the upper end 21 to the lower end 22. Taper may provide a larger surface for hand at upper end and also may also provide structural integrity to base 20 and focus force applied on base 20 from base 20 to cutter 40 during cutting action. Preferably, base 20 is frustoconical so that upper end 21 and lower end 22 are substantially cylindrical. However, side wall 23 may be generally perpendicular to upper end 21 and lower end 22. Base 20 may be made of a lightweight, rigid material such as plastic, paperboard or cardboard but may be made of other materials, and the angle of taper may be chosen based on the rigidity and strength of the material chosen to make base 20.

Cover 30 may have a closed end 31, and open end 32 and at least one second side wall 33. Preferably, cover 30 is also frustoconical so that closed end 31 and open end 32 are substantially cylindrical. Cover 30 may comprise a second lip 34 proximate open end 32 and extending outward from the second side wall 33 and may further comprise at least one recess 37 in the closed end 31. Preferably recess 37 has a central portion 38 forming a deeper depression in closed end 31. Second side wall 33 may taper at a generally constant second angle from the open end to the closed end. Preferably, the first angle of the base 20 is substantially equal to the second angle of the cover 30. Still more preferably, lower end 22 of base 20 is sized to fit inside closed end 31 of cover 30 so that base 20 may nest inside cover 30 after driving. Open end 32 of cover, in addition to being wider than closed end 31 may be designed to better transmit force applied by a user during driving. For example, side wall 33 proximate open end 32 may have an ergonomic hand grip including depressions for a user's fingers or may include an indicator for positioning of a user's hands. In addition or alternatively, side wall 33 proximate open end 32 may be thicker than the remainder of side wall 33 for added rigidity.

Cover 30 may be made of a plastic or other translucent material so as to display food during storage. Preferably, internal side wall 33 of cover 30 is generally smooth so as to not restrict rotational movement of base 20 when base 20 is driven downward during cutting. Alternatively, base 20 and or cover 30 may work together to restrict relative rotational movement. For example, base 20 and cover 30 may have interfacing tabs and grooves extending along side walls 23, 33 generally from the upper end 21 to the lower end 22 of base 20 and the closed end 31 to the open end 32 of cover 30.

Cover 30 may be sized to accommodate an average-sized fruit item. For example, if container 10 is used to store gala apples, cover 30 may have dimensions similar to an average size gala apple. However, cover 30 may be dimensioned slightly larger to accommodate apples of varying sizes while still restricting movement of the apple so as to minimize bruising or other damage.

Cover 30 may be a substantially solid piece, i.e., closed end 31 and side wall 33 may be generally uninterrupted. However, cover 30 may have at least one hole 39. Hole 39 may be in closed end 31 or side wall 33, preferably in side wall 33. In this way, fresh air may be allowed to circulate over the food item. In the case of an apple or other fruit, hole 39 may further permit ethylene or other gases to escape, slowing ripening or rotting of the fruit. Hole 39 may be preferably in side wall 33 so as to minimize leaking of juices that may be emitted when cover 30 is inverted and apple is sliced inside cover 30. Holes 39 may be sized so as to permit the escape of gases but preferably are not large enough to allow a consumer to have significant contact with the food item in order to maintain hygienic conditions. Alternatively, cover may be made of a permeable material that allows for one-way transmission of ethylene gas, i.e., in an outward direction but not back inward.

In another embodiment, side wall 33 of cover 30 may have one or more notches at open end 32. When engaged with base 20, notches may elevate cover 30 to form the at least one hole 39 in cover 30 to allow for air flow through hole 39 between base 20 and cover 30.

Cover 30 is removably attachable to base 20. Preferably, cover 30 is press fit or frictionally engaged with base 20. Friction fit may be the simplest connection to make while still providing sufficient holding strength so as to avoid accidental separation of base 20 and cover 30, especially if base 20 and holder 30 are made from different materials. However, alternative types of connections may be possible. For example, base 20 or cover 30 may have one or more protrusions to fit into a corresponding slot in the other piece.

Base 20 and cover 30 may additionally have a seal 80 spanning the intersection between base 20 and cover 30. Seal 80 may be, e.g., a freshness seal bearing the date on which the food product was packaged or by which it should be used. Alternatively or in addition, seal 80 may serve as an anti-tampering device.

Cutter 40 may have a central hub 42 with a plurality of blades 44 extending outward from hub 42 for cutting food. Central hub 42 may extend beyond a lower end of each of the blades 44. In this way, the central hub 42 may pierce the food first, centering the cutter 40 and facilitating driving of the blades 44 into the food. Central hub 42 and blades 44 may interface with recess 37 and central portion 38 when base 20 is inverted and inserted into cover 30. In another embodiment, recess 37 in closed end 31 of cover 30 may only comprise central portion 38. Interfacing caused by central portion 38 and/or recess 37 with central hub 42 and/or blades 44 may allow central hub 42 and blades 44 to penetrate all the way through apple to separate slices from the core portion. Cutter 40 may be made of plastic, ceramic, metal, any combination thereof, or other strong, lightweight materials.

In one embodiment, cutter 40 has six or eight substantially equally spaced blades 44 and further has an outer rim 48 connecting the distal ends 45 of each of the blades 44. In another embodiment, as seen in FIG. 4, cutter 40 may have four substantially equally spaced blades 44 with outer rim 48 spanning distal ends 45 of alternating pairs of consecutive blades 44. Blades 44 may be straight, serrated or any combination thereof. At least one blade 44, but preferably all blades 44 may have a chamfer 46 to further facilitate cutting into food.

Cutter 40 may be fixedly attached to base 20 by various means, for example by gluing outer rim 48 to base or by molding base 20 around outer rim 48. In another embodiment a second outer rim 49 may extend at least substantially around a perimeter of cutter 40. Second outer rim may then be adhered to both cutter 40 and base 20. Alternatively, cutter 40 may be sized larger than lower end 22 of base 20 so that outer rim 48 is external to base 20. Mating between base 20 and cutter 40 may then be accomplished by providing cutter 40 with a lip into which lower end 22 is inserted. Cutter 40 may be proximate lower end 22 of base 20. Preferably cutter 40 is spaced slightly from lower end 22. Gap formed between cutter 40 and lower end 22 may serve several purposes. First, gap may allow for a shield 70 to be removably attached to lower end 22. Shield 70 may be made of a foil, plastic film, paperboard or other material and may serve to prevent a user from touching and/or accidentally cutting himself on blades 44. Shield 70 may be opaque so as to hide cutter 40 from view until use. However, shield 70 may also be made of a translucent material. Second, gap may create a tongue formed by side wall 23 at lower end 22. Preferably, cover 30 has a similarly sized and shaped groove in closed end 31. In this way, multiple containers 10 may be stacked on top of one another for convenient, stable storage.

Container 10 may further comprise an accessory cup 50 such as a cup holding caramel or another sauce for dipping. Accessory cup 50 may have an upper lip 52 and upper side wall 54 for operatively engaging base 20 prior to use. In the embodiment shown in FIG. 1, upper lip 52 may operatively engage bottom portion 25 of lip 24 and upper side wall 54 may operatively engage side wall 23 of base. The apple may then rest on the upper lip 52 of the accessory cup 50, but preferably the apple and accessory cup 50 are spaced from each other by a separator 60. Separator 60 may be paperboard or plastic or other suitable material and may elevate the apple for better display and to provide a layer of insulation between the fruit and the top of accessory cup 50, e.g., to prevent accidental punctures of a lid of accessory cup 50. Separator may be a generally planar surface or disk, but separator 60 may also have orienting features such as a central depression or multiple circumferentially spaced depressions to generally maintain a desired orientation of the apple. Interface between upper lip 52 of accessory cup 50 with bottom portion 25 and/or separator 60 may effectively "lock" accessory cup 50 into place during transport.

In another embodiment, as shown in FIG. 5, accessory cup 50 may not have upper lip 52 and upper side wall 54. Instead, accessory cup 50 may have an arm 51 extending from upper surface 56 from a proximal end 55 to a distal end 53. Distal end 53 may be angled substantially similarly to generally constant first angle of side wall 23 of base. In addition, proximal end 55 of arm 51 may have a tongue 57 shaped similarly to lip 24 of base 20. As such, accessory cup 50 may be hung from the top of base 20 such that tongue 57 operationally engages lip 24 and distal end 53 operationally engages side wall 23. Regardless of the form used for accessory cup 50, cup 50 may be sized to have a height less than or equal to the distance between cutter 40 and lip 24 of base 20 so that accessory cup 50 may be stored inside base 20 prior to use.

As opposed to the "pedestal" embodiment of FIGS. 1-3, in still another embodiment, as shown in FIGS. 6-7, container 110 may have base 120 located above cover 130 in a "piston" configuration. Base 120, cover 130, cutter 140, accessory cup 150 and seal 180 may be structurally and functionally similar to base 20, cover 30, cutter 40, accessory cup 50 and seal 80 of the embodiment of FIGS. 1-3. Container 110 may further have a separator 160 having a generally downward facing groove 162 and a generally upward facing centered depression 164. Downward facing groove 162 may operationally engage lip 134 at open end 132 of cover 130. In addition, depression 164 may be sized to be substantially the same as lower end 122 of base 120 so that base 120 may rest inside depression 164. Alternatively, depression 164 may be slightly smaller than lower end 122 of base 120 to form an interference fit between separator 160 and base 120. Separator 160 may be more structurally rigid than separator 60, i.e., it may be made from paperboard or a paper pulp product in order to support base 120 and accessory cup 150 and to prevent cutter 140 in lower end 122 of base from prematurely, accidentally cutting into the food item.

Continuing with the embodiment of FIGS. 6-7, container 110 may have a film or other type of sealant 190 across open end 121 of base 120 so as to hold accessory cup 150 inside base 120.

This embodiment may be more functionally intuitive to a user because it does not require reorienting any of the elements of container 110. Instead, a user only has to remove sealant 190 and accessory cup 150 from base 120, remove seal 180 and separator 160 from between base 120 and cover 130, and then drive base 120 downward into the apple.

Method of Use:

To use container 10, in one embodiment, remove seal 80 and separate cover 30 from base 20. Remove food, separator 60 and accessory cup 50 from base. Invert cover 30 and place food in cover 30. Remove shield 70 from base 20. Place base 20 over food, centering hub 42 over center of food. Drive base 20 by driving cutter 40 through food, having centering hub 42 penetrate food first followed by blades 44 until blades 44 and centering hub 42 interface with recess 37 and central portion 38, respectively. This driving motion, by having a larger upper end 21 and a smaller lower end 22 takes advantage of a user's leverage and focuses the force generated by a user to more easily drive cutter 40 through food. Side walls 23 of base 20 and side walls 33 of cover 30 may operationally engage to provide greater alignment during the driving action. Base 20 and cover 30 may also be dimensioned so that side walls 23 and 33 form a close fit, preferably an interference fit after driving. Close fit between base 20 and cover 30 may contain juices or other liquids that are emitted from the food item during the cutting process. Moreover, closed end 31 of cover 30 may contain the juices to keep the surface on which container 10 is placed dry. In one embodiment, accessory cup 50 may be placed on edge of base 20 with arm 51 interfacing with base side wall 23 and tongue 57 on proximal end 53 operatively engaged with lip 24 of base.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. A food slicer, comprising:
   a first receptacle having a side wall disposed between an open first end and an open second end;
   a second receptacle removably attached to said first receptacle having a side wall;
   a cutter coupled to said first receptacle proximate one of said first end and said second end, said cutter having a hub and a plurality of blades;
   wherein said first receptacle sidewall forms the perimeter of a single, internal void, extending from a top of said cutter to an upper end of said first receptacle;
   wherein, when slicing, said first receptacle is configured to move into a nested configuration within said second receptacle.

2. A food slicer according to claim 1, said first receptacle further comprising a lip at said upper end, said lip having a bottom portion and a first side portion;
   said second receptacle further comprising a lip at an open end having an outwardly extending portion and a second side portion;
   wherein said first side portion operatively engages said second side portion.

3. A food slicer according to claim 2, further comprising an accessory cup.

4. A food slicer according to claim 3, said accessory cup comprising an arm having proximal end having a tongue and a distal end;
   wherein said arm operatively engages said first receptacle side wall and said tongue operatively engages said first receptacle lip.

5. A food slicer according to claim 1, wherein said hub has a lower end that extends beyond a lower end of said blades.

6. A food slicer according to claim 5, said second receptacle further comprising a recess having a central portion at a closed end, wherein said central portion at least partially encloses said lower end of said hub when said first receptacle is fully inserted into said second receptacle.

7. A food slicer according to claim 1, wherein said second receptacle has a closed end comprising a recess for receiving said cutter.

8. A food slicer according to claim 1, further comprising a shield removably attached to a lower end of said first receptacle.

9. A food slicer according to claim 2, further comprising a separator between said outwardly extending portion and said bottom portion of said lip.

10. A food slicer according to claim 1 wherein said cutter is fixedly attached to said first receptacle.

11. A food slicer, comprising:
- a base having an upper end and a lower end having a cutter having a plurality of blades and a hub;
- a shield removable attached to said lower end of said base proximate said cutter;
- a cover having an open end and a closed end and removably attached to said base, said cover having a recess at said closed end that is sized for receiving said blades and said hub of said cutter;
- and a separator between said base and said cover.

12. A food slicer according to claim 11 wherein said hub of said cutter extends beyond said blades.

13. A food slicer according to claim 11 wherein said cover is translucent.

14. A food slicer according to claim 11 wherein said base has at least one side wall tapered at a first angle from said upper end to said lower end,
- wherein said cover has at least one second side wall tapered at a second angle from said open end to said closed end,
- and further wherein said first angle is substantially the same as said second angle.

15. A food slicing and containing system comprising:
- a food item;
- a first receptacle having a side wall having a continuous perimeter around the receptacle and along a length of the first receptacle;
- a second receptacle removably attached to said first receptacle having a side wall that has a substantially continuous perimeter along a length of the second receptacle;
- a cutter having a hub and a plurality of blades, said cutter coupled to said first receptacle;
- wherein when in a first pre-slicing position, one of said receptacles is held in a substantially non-overlapping position by the other of said receptacles and said food item is substantially contained within one of said receptacles;
- and wherein when in a second post-slicing position, one of said receptacles nests inside the other of said receptacles and said food item substantially nests within both of said receptacles.

* * * * *